(12) United States Patent
Hong et al.

(10) Patent No.: US 7,564,513 B2
(45) Date of Patent: *Jul. 21, 2009

(54) LIQUID CRYSTAL DISPLAY DEVICE, MOUNTING DEVICE FOR MOUNTING A LIQUID CRYSTAL DISPLAY DEVICE, AND METHOD FOR ASSEMBLING A LIQUID CRYSTAL DISPLAY DEVICE

(75) Inventors: Lin-Yun Hong, Shenzhen (CN); Yue-Hai Zhang, Shenzhen (CN); Hsuan-Chen Chen, Tu-Cheng (TW); Chien-Li Tsai, Tu-Cheng (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 259 days.

This patent is subject to a terminal disclaimer.

(21) Appl. No.: 11/309,926

(22) Filed: Oct. 27, 2006

(65) Prior Publication Data

US 2007/0242182 A1 Oct. 18, 2007

(30) Foreign Application Priority Data

Apr. 12, 2006 (CN) .................. 200610060265.6

(51) Int. Cl.
*G02F 1/1333* (2006.01)
(52) U.S. Cl. ....................................................... 349/58
(58) Field of Classification Search .................. 349/58, 349/60
See application file for complete search history.

(56) References Cited

U.S. PATENT DOCUMENTS

| | | | |
|---|---|---|---|
| 6,002,582 A | 12/1999 | Yeager et al. | |
| 6,671,012 B1* | 12/2003 | Tanaka | 349/58 |
| 7,274,558 B2* | 9/2007 | Ito et al. | 361/681 |
| 7,277,276 B2* | 10/2007 | Tsukuda | 361/681 |
| 2004/0041961 A1* | 3/2004 | Lee | 349/58 |
| 2005/0225694 A1* | 10/2005 | Akagawa et al. | 349/58 |
| 2005/0253035 A1* | 11/2005 | Dozier | 248/286.1 |
| 2006/0055839 A1* | 3/2006 | Hirao et al. | 349/58 |
| 2007/0263347 A1* | 11/2007 | Hong et al. | 361/681 |

FOREIGN PATENT DOCUMENTS

TW 478603 3/2002

\* cited by examiner

*Primary Examiner*—Andrew Schechter
*Assistant Examiner*—Charles Chang
(74) *Attorney, Agent, or Firm*—Wei Te Chung

(57) ABSTRACT

A Liquid Crystal Display (LCD) device includes a bezel, a mounting bracket, a movable bracket, and an LCD panel. The bezel defines an opening. The mounting bracket is mounted to a side of the bezel. The movable bracket is slidably mounted to an opposite side of the bezel and movable with respect to the mounting bracket. The LCD panel is sandwiched between the mounting bracket and the movable bracket and visible via the opening in the bezel. The cover is mounted to the bezel.

11 Claims, 7 Drawing Sheets

LIQUID CRYSTAL DISPLAY DEVICE, MOUNTING DEVICE FOR MOUNTING A LIQUID CRYSTAL DISPLAY DEVICE, AND METHOD FOR ASSEMBLING A LIQUID CRYSTAL DISPLAY DEVICE

CROSS-REFERENCES TO RELATED APPLICATION

This application is related to a copending application entitled with "MOUNTING APPARATUS FOR LCD PANEL", (application Ser. No. 11/614,998) filed on Dec. 22, 2006, and assigned to the same assignee.

FIELD OF THE INVENTION

The invention relates to Liquid Crystal Display (LCD) devices. In particular, the present invention relates to an LCD device which can be adjusted to have different size LCD panels mounted thereon.

DESCRIPTION OF RELATED ART

A typical folded electronic device, such as a notebook computer, includes a base unit, and a display unit pivotably mounted to the base unit.

In Taiwan Patent No. 478603, a display unit of a notebook computer includes a cover, a bezel, an LCD panel, a pair of elastic members, and a plurality of screws. In assembling the LCD panel, the elastic members are mounted to opposite sides of the LCD panel via a plurality of screws. The elastic members are mounted to opposite sides of the cover via a plurality of screws. Then, the bezel is mounted to the cover via a plurality of screws. However, this way of securing the LCD panel only allows mounting of a specific size of LCD panel. In practice, however, widths of the LCD panels vary because of inconsistencies in practical production. This leads to the LCD panels being forcibly fit by stretching or compressing components of the display units, which may lead to damage to the LCD panels during the mounting process.

What is needed is an LCD device which can be adjusted to receive different size LCD panels thereon.

SUMMARY OF THE INVENTION

An exemplary liquid crystal display (LCD) device includes a bezel, a mounting bracket, a movable bracket, and an LCD panel. The bezel defines an opening. The mounting bracket is mounted to a side of the bezel. The movable bracket is slidably mounted to an opposite side of the bezel and movable with respect to the mounting bracket. The LCD panel is sandwiched between the mounting bracket and the movable bracket and visible via the opening in the bezel.

Other advantages and novel features will become more apparent from the following detailed description when taken in conjunction with the accompanying drawing, in which:

DETAILED DESCRIPTION OF THE INVENTION

Figure 1:
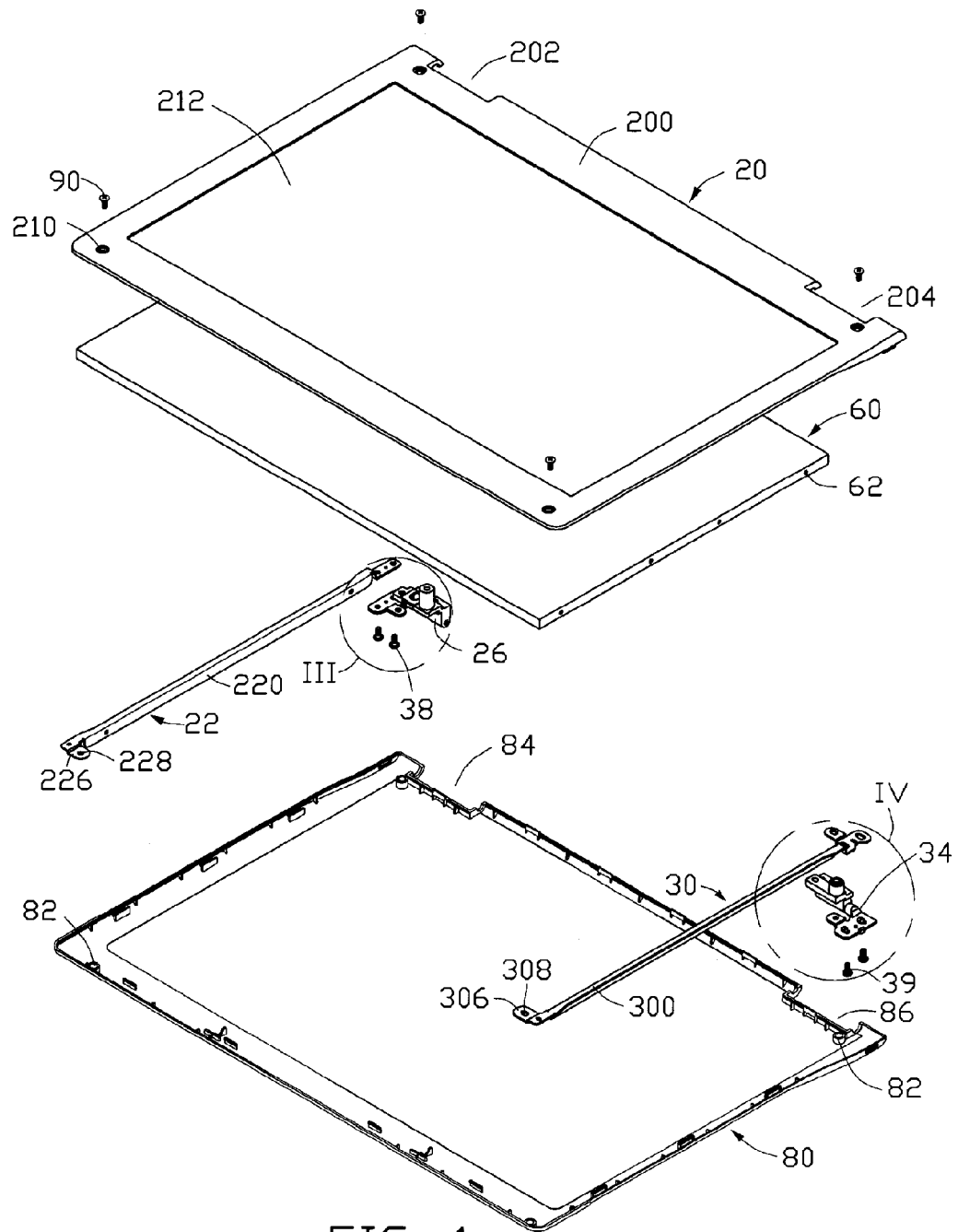
FIG. 1 is an exploded, isometric view of an LCD device in accordance with a preferred embodiment of the present invention, the LCD device including a bezel, a cover, and an LCD panel.

Referring to FIG. 1, a liquid crystal display (LCD) device in accordance with a preferred embodiment of the present invention includes a bezel 20, an LCD panel 60, and a cover 80. A mounting bracket 22, a first pivot member 26, a movable bracket 30, and a second pivot member 34 are mounted on the bezel 20 via a plurality of screws 38 and 39.

Figure 2:
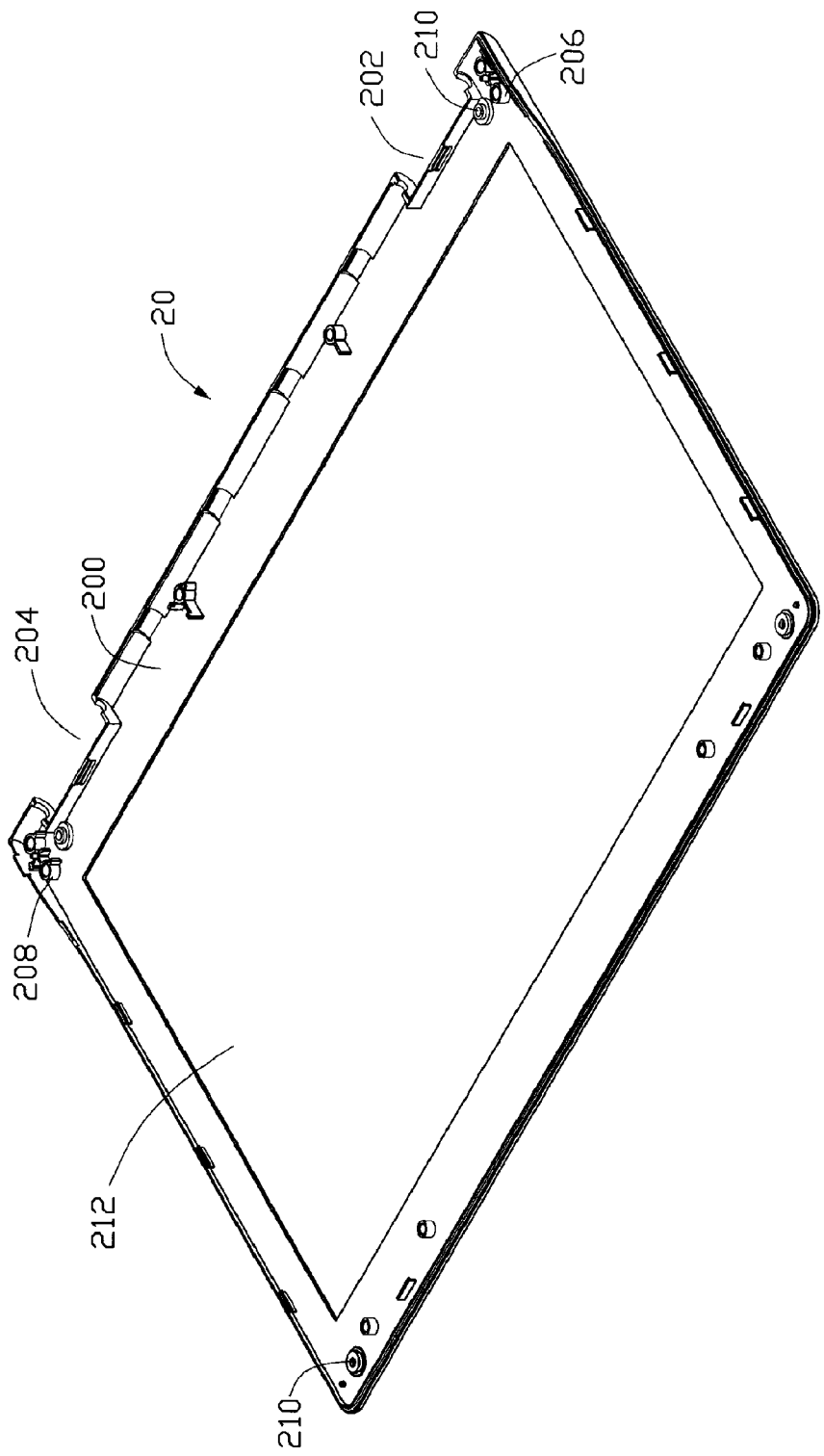
FIG. 2 is an inverted, enlarged view of the bezel of FIG. 1.

Referring also to FIG. 2, the bezel 20 defines an opening 212 therein. Two notches 202 and 204 are defined in an edge of the bezel 20. A pair of seats 206 each defining a threaded hole is set near the notch 202. A pair of seats 208 each defining a threaded hole is set near the notch 204. Four mounting holes 210 are defined in the bezel at four corners, respectively.

Figure 3:
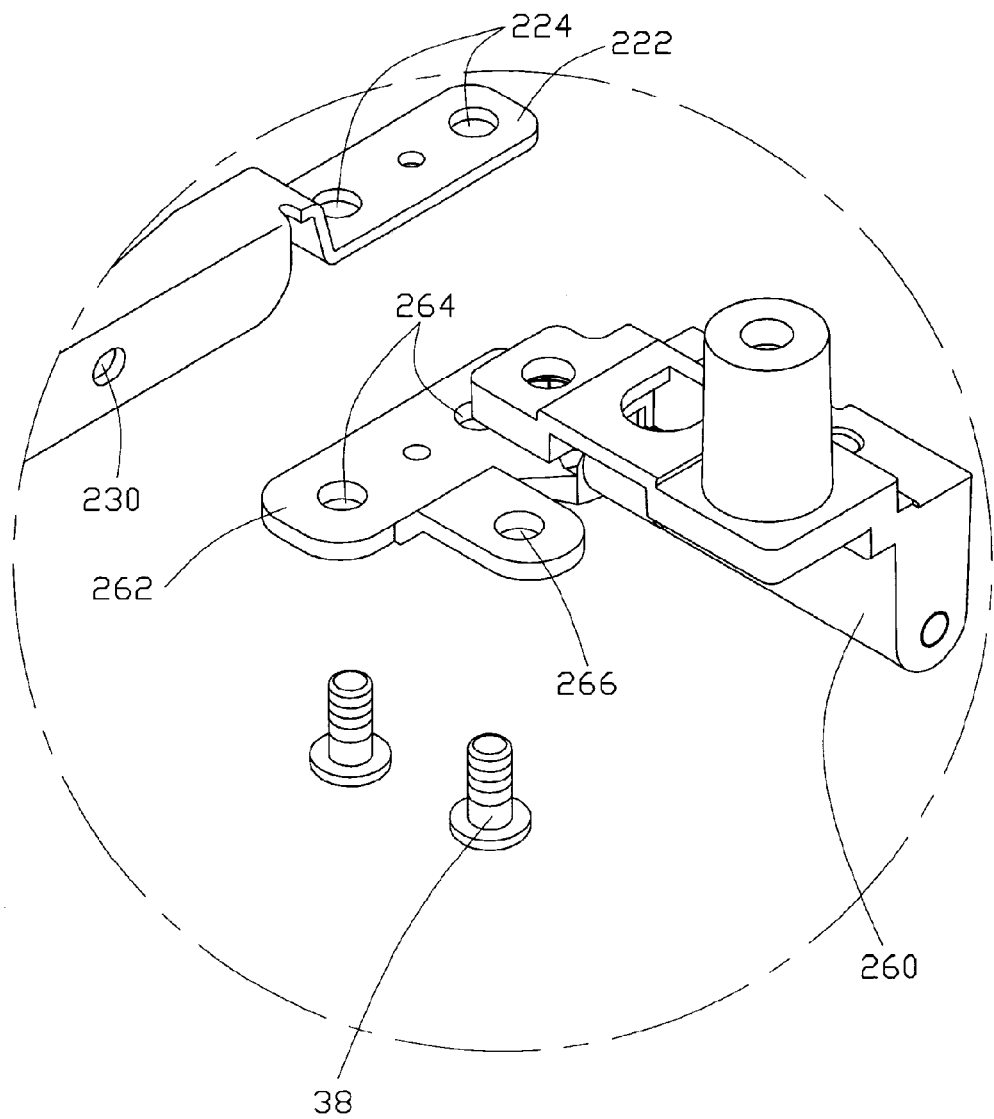
FIG. 3 is an enlarged view of a circled portion III of FIG. 1.

Referring also to FIG. 3, the mounting bracket 22 has a main body 220 having an L-shaped configuration. A mounting plate 222 extends from an end of the main body 220. A pair of apertures 224 is defined in the mounting plate 222. A protruding plate 226 extends perpendicularly from an opposite end of the main body 220. A locking hole 228 is defined in the protruding plate 226. A plurality of bores 230 is defined in the main body 220 adjacent to the mounting plate 222 and the protruding plate 226 respectively.

The first pivot member 26 includes a pivoting portion 260, and a generally T-shaped fixing portion 262. A pair of mounting holes 264 and a through hole 266 are defined in the fixing portion 262 of the first pivot member 26.

Figure 4:
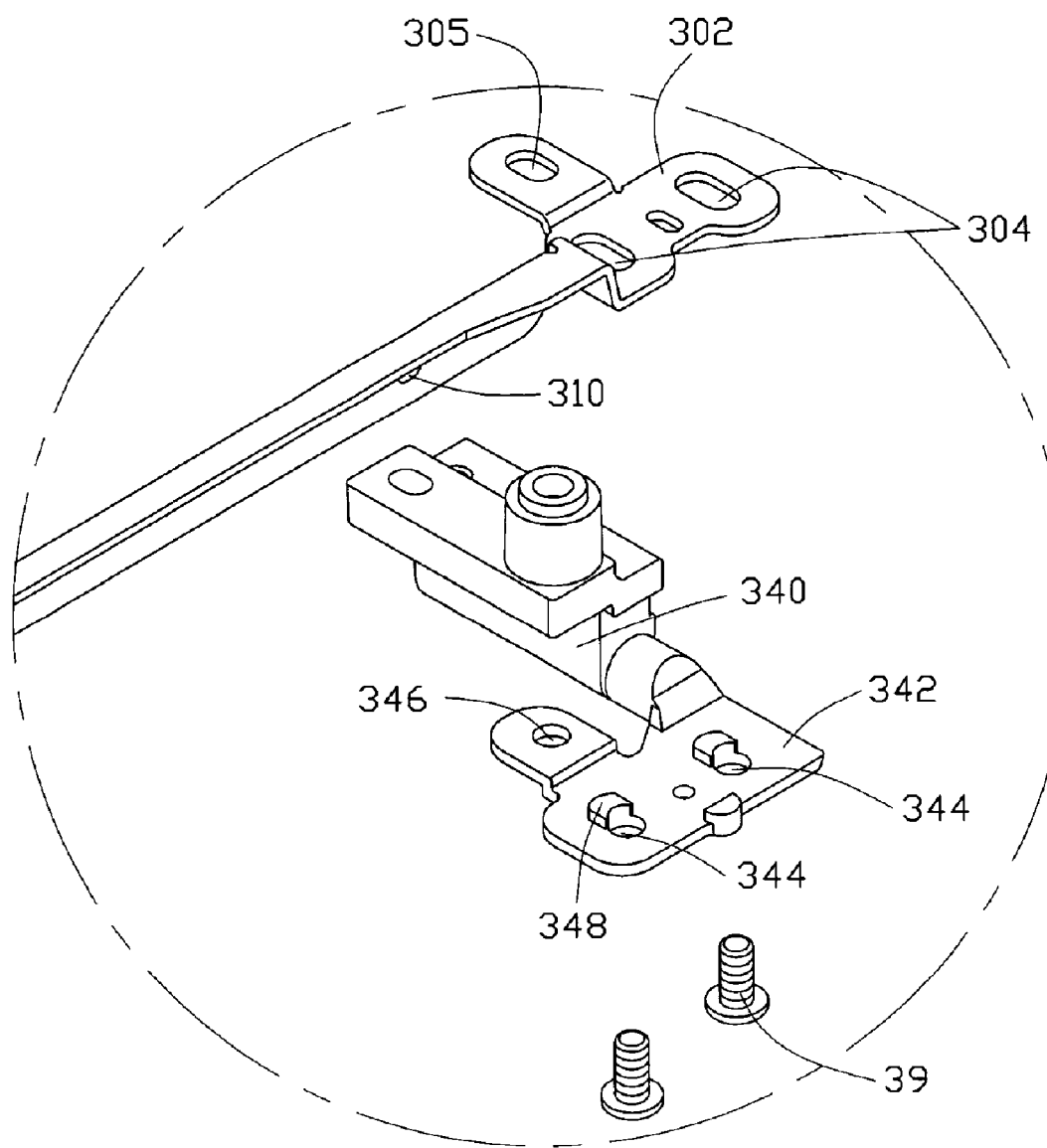
FIG. 4 is an enlarged view of a circled portion IV of FIG. 1.

Referring also to FIG. 4, the movable bracket 30 includes a main body 300 having an L-shaped configuration. A generally L-shaped mounting plate 302 extends from an end of the main body 300. A pair of elongated adjustment holes 304 and an elongated mounting hole 305 are defined in the mounting plate 302. A protruding plate 306 is bent perpendicularly from an opposite end of the main body 300. An elongated locking hole 308 is defined in the protruding plate 306. A plurality of bores 310 is defined in the main body 300.

The second pivot member 34 includes a pivoting portion 340, and a generally L-shaped fixing portion 342 formed from a cylindrically shaped distal end of the pivoting portion 340. A pair of mounting holes 344 and a through hole 346 are defined in the fixing portion 342 of the second pivot member 34. A partition portion 348 protrudes upward adjacent each mounting hole 344, corresponding to the adjustment holes 304 of the movable bracket 30.

The LCD panel 60 is a thin rectangular parallelepiped. The LCD panel 60 defines a plurality of locking holes 62 in opposite sides thereof, corresponding to the bores 230 of the mounting bracket 22 and bores 310 of the movable bracket 30.

Four fixing poles 82 each defining a threaded hole are set in the cover 80 at four corners, respectively. Two notches 84 and 86 are defined at an edge of the cover 80 corresponding to the notches 202 and 204 of the bezel 20.

Figure 5:
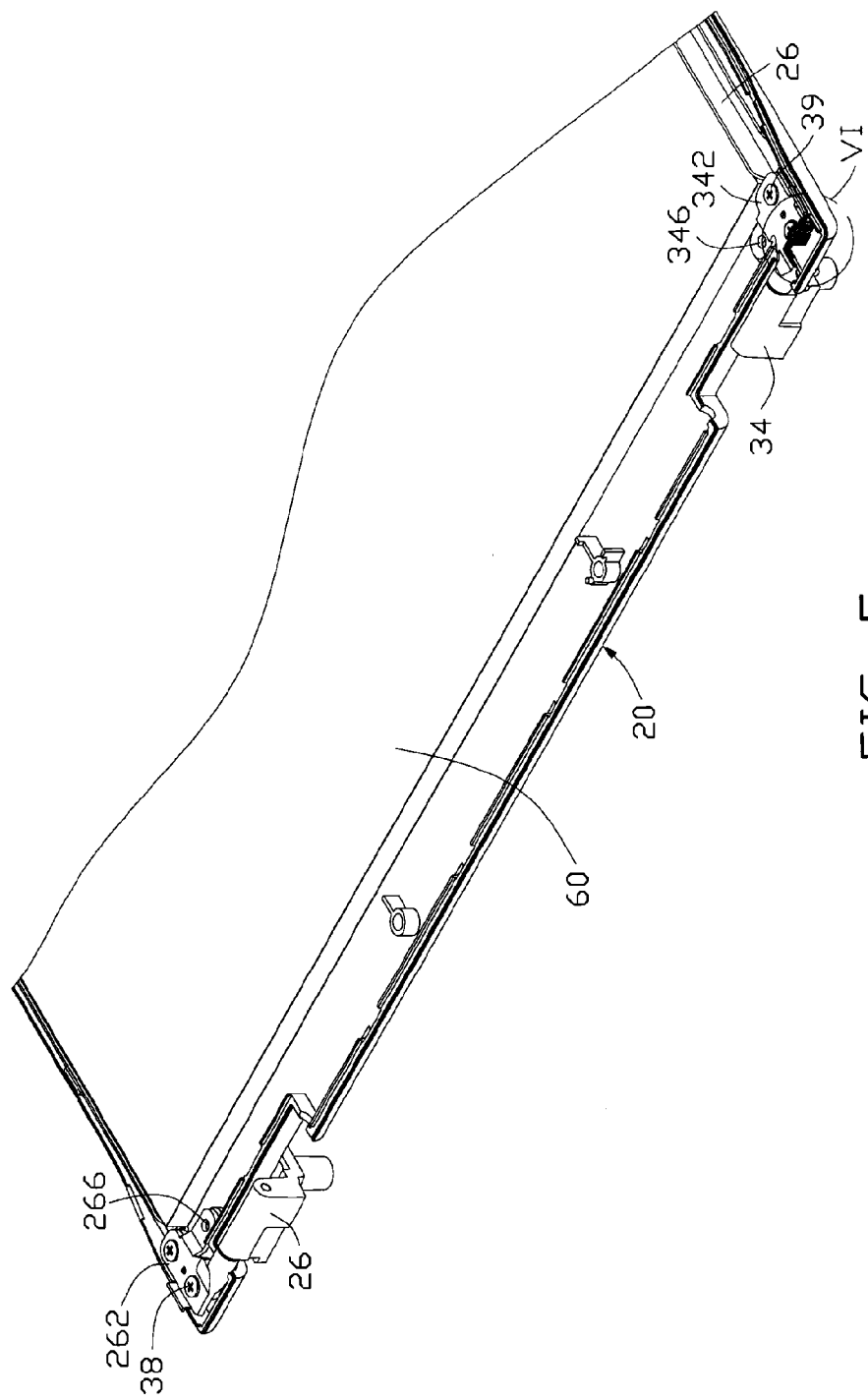
FIG. 5 is a sectional assembled view of the bezel and the LCD panel of FIG. 1, but viewed from another aspect.
Figure 6:
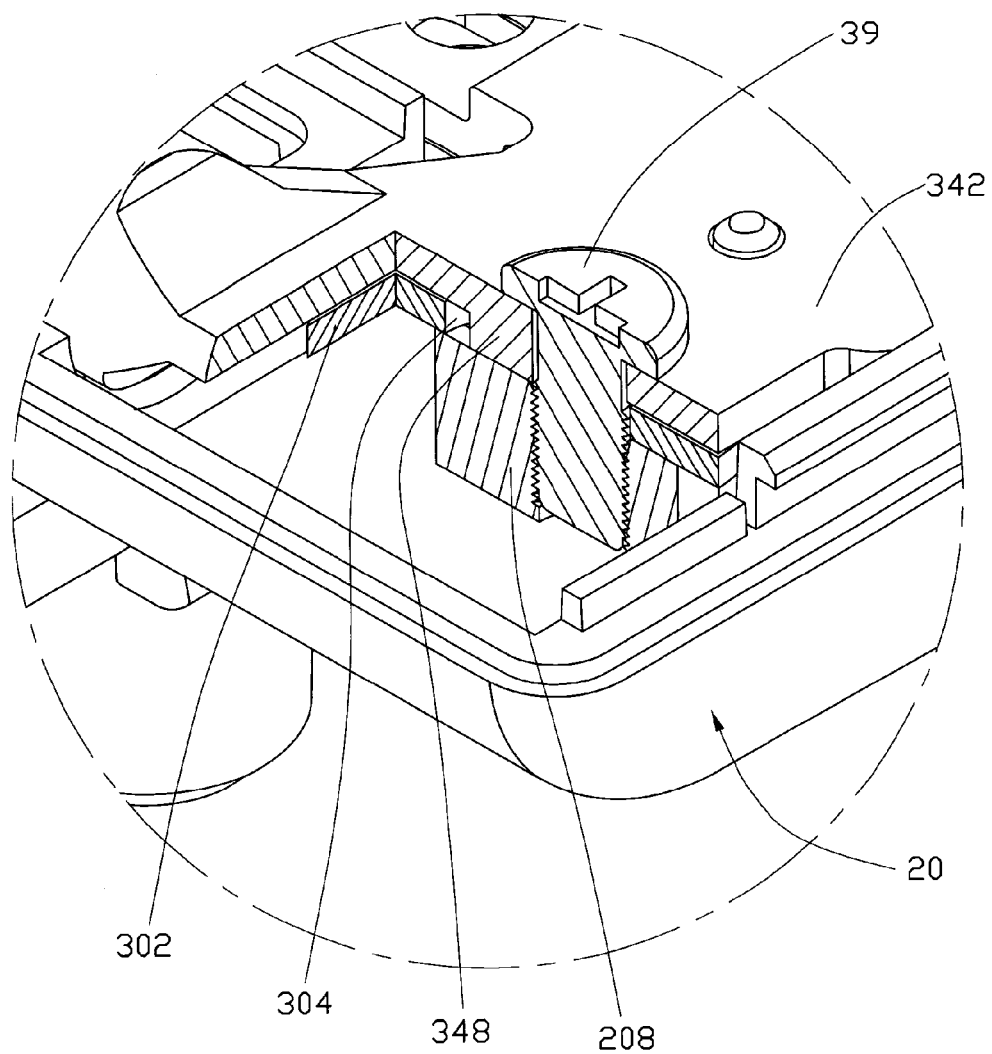
FIG. 6 is an enlarged view of a circled portion VI of FIG. 5.
Figure 7:
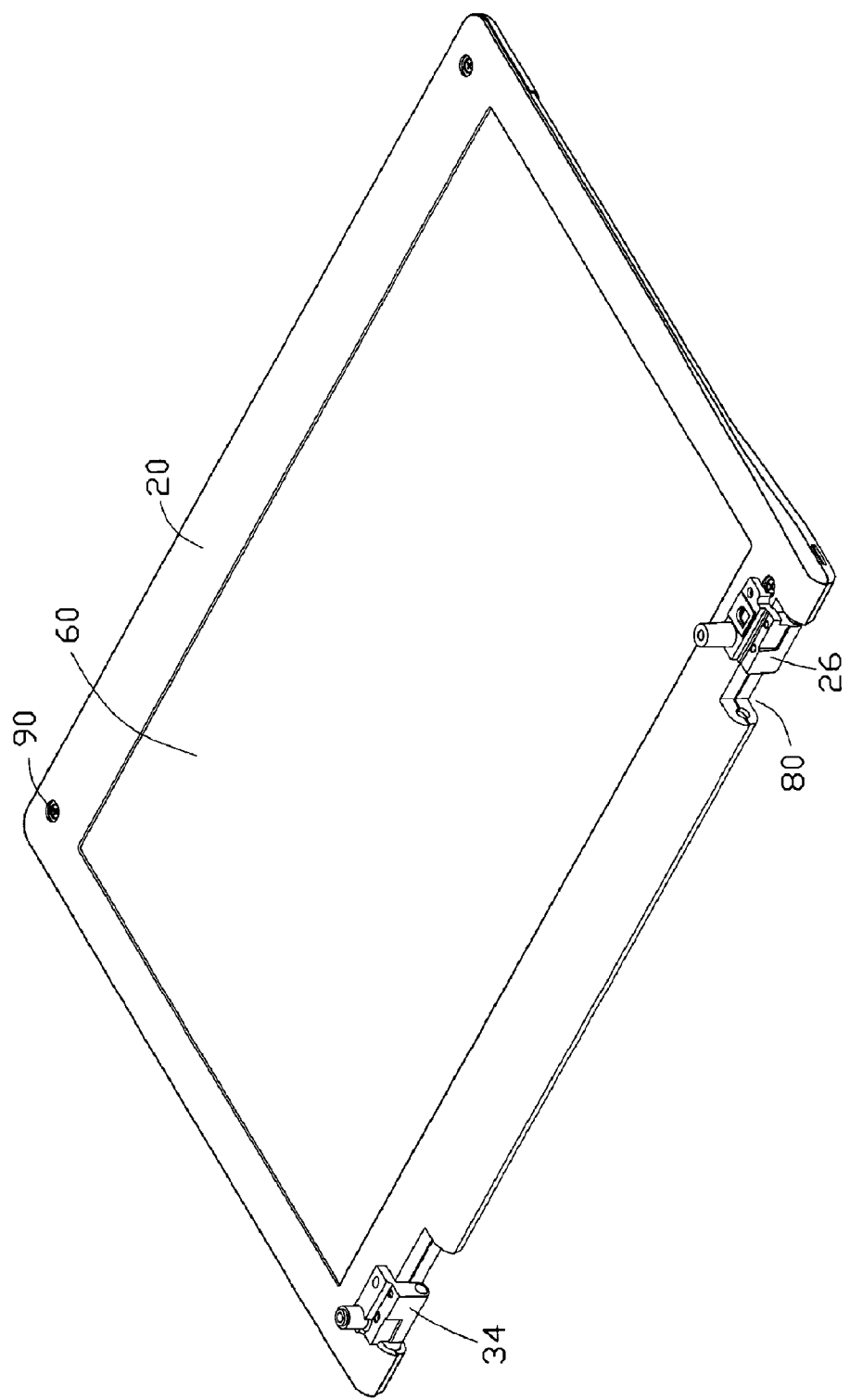
FIG. 7 is an assembled view of FIG. 1, but viewed from another aspect.

Referring to FIGS. 5 to 7, in assembly, two screws 38 are inserted through the mounting holes 264 of the first pivot member 26 and the apertures 224 of the mounting bracket 22, to engage in the corresponding seats 206 of the bezel 20. Thus, the first pivot member 26 and the mounting bracket 22 are mounted to the bezel 20. Two screws 39 are inserted through the mounting holes 344 of the second pivot member 34 and the adjustment holes 304 of the movable bracket 30, to engage in the corresponding seats 208 of the bezel 20. Thus, the second pivot member 34 and the movable bracket 30 are mounted to the bezel 20. At this time, the mounting plate 302 of the movable bracket 30 abuts against the seats 208 of the bezel 20, the fixing portion 342 of the second pivot member 34 is generally positioned above the mounting plate 302, and the partition portions 348 are received in the corresponding adjustment holes 304 of the movable bracket 30. A height of the partition portions 348 is greater than a thickness of the mounting plate 302 of the second pivot member 34, so that the partition portions 348 abut against the corresponding seats 208 of the bezel 20 to raise the fixing portion 342 a distance above the mounting plate 302 of the movable bracket 30. In addition, clearance is provided in the adjustment holes 304 allowing the movable bracket 30 to slide a small distance relative to the bezel 20 in a width direction of the bezel 20 under the guidance of the partition portions 348 of the fixing portions 342.

The LCD panel 60 is placed in a receiving space defined by the bezel 20, the mounting bracket 22 and the movable bracket 30. Because the movable bracket 30 can slide a small distance relative to the second pivot member 34 and the bezel 20, the receiving space defined by the mounting bracket 22 and the movable bracket 30 can be adjusted in width to suit different sized LCD panels 60. Screws are inserted through the bores 230, 310 of the mounting bracket 22 and the movable bracket 30 to engage in the corresponding locking holes 62 of the LCD panel 60. Thus, the LCD panel 60 is mounted to the bezel 20. The LCD panel 60 is visible via the opening 212 in the bezel 20.

To attach the cover 80 to the bezel 20, four fasteners, such as screws 90 are inserted through the mounting holes 210 of the bezel 20, the through hole 266 of the first pivot member 26, the locking hole 228 of the mounting bracket 22, the mounting hole 305 of the movable bracket 30 and the through hole 346 of the second pivot member 34, and the locking hole 308 of the movable bracket 30, to engage in the corresponding fixing poles 82 of the cover 80. The protruding plate 306 and a bounding portion of the mounting hole 305 of the mounting plate 302 of the movable bracket 30 are tightly sandwiched between the bezel 20 and the corresponding fixing poles 82 of the cover 80.

The notch 84 of the cover 80 and the notch 202 of the bezel 20 cooperatively form a first receiving space for receiving the first pivot member 26. The notch 86 of the cover 80 and the notch 204 of the bezel 20 cooperatively form a second receiving space for receiving the second pivot member 34. The LCD device can be pivotably mounted to a base of a notebook computer via the pivoting portion 260 of the first pivot member 26 and the pivoting portion 340 of the second pivot member 34.

When the LCD panel 60 is needed to repair, the screws 90 are unscrewed to allow the cover being detached from the bezel 20. The movable bracket 30 and the mounting bracket 22 are then detached from the LCD panel 60. After that, the LCD panel 60 can be removed from the receiving space via moving the movable bracket 30 away from the LCD panel 60 to thereby release the LCD panel 60, without detaching the mounting bracket 22 and the movable bracket 30 from the bezel 20.

It is to be understood, however, that even though numerous characteristics and advantages of the preferred embodiments have been set forth in the foregoing description, together with details of the structures and functions of the embodiments, the disclosure is illustrative only, and changes may be made in detail, especially in matters of shape, size, equivalent material and arrangement of parts within the principles of the invention to the full extent indicated by the broad general meaning of the terms in which the appended claims are expressed.

What is claimed is:

1. A Liquid Crystal Display (LCD) device, comprising:
   a bezel defining an opening;
   a mounting bracket mounted to a side of the bezel;
   a movable bracket slidably mounted to an apposite side of the bezel and movable with respect to the mounting bracket;
   an LCD panel sandwiched between the mounting bracket and the movable bracket and visible via the opening in the bezel; and
   a cover mounted to the bezel;
   wherein the LCD device further comprises a first pivot member having a fixing portion, a mounting hole is defined in the fixing portion, an adjustment hole is defined in an end of the movable bracket, a seat defining a threaded hole is set in the bezel, a screw is inserted through the mounting hole of the first pivot member and the adjustment hole of the movable bracket to engage in the seat of the bezel, and the fixing portion of the first pivot member is generally positioned above and without interfering with the end of the movable bracket.

2. The LCD device as claimed in claim 1, further comprising a second pivot member, wherein two mounting holes are defined in the second pivot member, two apertures are defined in an end of the mounting bracket, two first seats each defining a threaded hole are set in the bezel, two screws are inserted through the mounting holes of the second pivot member and the apertures of the mounting bracket to engage in the corresponding first seats of the bezel.

3. The LCD device as claimed in claim 1, wherein a partition portion protrudes out adjacent the mounting hole of the first pivot member, the partition portion is so dimensioned that the partition portion raises the fixing portion of the first pivot member a distance above the end of the movable bracket when the partition portion extends through the adjustment hole of the movable bracket and engages the seat of the bezel, and the adjustment hole in the movable bracket is so dimensioned to allow the movable bracket to move in a direction perpendicular to the opposite side of the LCD panel under guidance of the partition portion of the first pivot member.

4. A mounting device for mounting a Liquid Crystal Display (LCD) device, the mounting device comprising:
   a bezel defining an opening;
   a cover mounted to the bezel;
   a mounting bracket positioned to the bezel adjacent the opening in the bezel; and
   a movable bracket movably mounted to the bezel and movable with respect to the mounting bracket such tat the movable bracket and the mounting bracket cooperatively define therebetween an adjustable space for adapting to different size LCD panels;
   wherein the mounting device further comprises a first pivot member having a fixing portion, a mounting hole is defined in the fixing portion, an adjustment hole is defined in an end of the movable bracket, a seat defining a threaded hole is set in the bezel, a screw inserted through the mounting hole of the first pivot member and the adjustment hole of the movable bracket to engage in the seat of the bezel, and the fixing portion of the first pivot member is generally positioned above and without interfering with the end of the movable bracket.

5. The mounting device as claimed in claim 4, further comprising a second pivot member, wherein two mounting holes are defined in the second pivot member, two apertures are defined in en end of the mounting bracket, two first seats each defining a threaded bole are set in the bezel, two screws are inserted through the mounting holes of the second pivot member and die apertures of the mounting bracket to engage in the corresponding first seats of the bezel.

6. The mounting device as claimed in claim 4, wherein a pair of elongated holes is defined in the end and an opposite end of the movable bracket, a pair of screws extends through the bezel and the elongated holes in the movable bracket to engage with to cover to thereby assemble the bezel to the cover such that the cover and bezel cooperatively tightly sandwiches the movable bracket therebetween after one of to LCD panels is assembled.

7. The mounting device as claimed in claim 4, wherein a partition portion protrudes out adjacent the mounting hole of the first pivot member, the partition portion is so dimensioned that the partition portion raises the fixing portion of the first pivot member a distance above the end of the movable bracket when the partition portion engages the seat of the bezel through the adjustment hole of the movable bracket, and the adjustment hole in the movable bracket is so dimensioned to allow the movable bracket to move along the partition portion of the first pivot member.

8. A method for assembling a Liquid Crystal Display (LCD) device which comprising an LCD panel, a mounting bracket, a movable bracket, a bezel, a pivot member, a partition member, and a cover, comprising steps of:

securing the mounting bracket to one side of die bezel;

slidably mounting the movable bracket to an opposite side of the bezel to form an adjustable receiving space between the mounting bracket and the movable bracket, the movable bracket defining an elongated slot;

positioning the pivot member to the movable bracket adjacent the elongated slot, the pivot member defining a mounting hole, a fastener extending through the mounting hole and the elongated slot to engage with the bezel;

securing the partition member in the elongated slot to separate the movable bracket and the pivot member with a gap formed therebetween at the vicinity of the elongated slot;

placing the LCD panel to the receiving space via moving the movable bracket to cause the receiving space having a size fitting to the LCD panel;

securing the mounting bracket with one side of the LCD panel;

securing the movable bracket with an opposite side of the LCD panel; and securing the cover and the bezel together such that the cover and the bezel sandwiches the LCD panel, the mounting bracket and the movable bracket therebetween.

9. The method as claimed in claim 8, further comprising a step of securing another pivot member to the mounting bracket before the mounting bracket is secured to the bezel, a fastener extending through the bezel and the pivot member to engage with the cover.

10. The method as claimed in claim 8, wherein the partition member protrudes out from the pivot member adjacent the mounting hole thereof.

11. The method as claimed in claim 8, wherein the pivot member defines an elongated locking hole, an additional fastener extending through the bezel and the looking hole to engage with the cover.

\* \* \* \* \*